United States Patent [19]

Binnie, Jr. et al.

[11] Patent Number: 5,129,990
[45] Date of Patent: Jul. 14, 1992

[54] METHOD FOR PRODUCING A GAS-TIGHT RADOME-TO-FUSELAGE STRUCTURAL BOND

[75] Inventors: John F. Binnie, Jr.; Willis B. Tolley, both of Tucson, Ariz.

[73] Assignee: Hughes Aircraft Company, Los Angeles, Calif.

[21] Appl. No.: 288,175

[22] Filed: Dec. 19, 1988

[51] Int. Cl.$^5$ .............................................. B44C 1/22
[52] U.S. Cl. ...................................... 156/629; 29/1.2; 102/517; 102/519; 156/80; 156/281; 156/293; 156/295; 156/306.9; 156/315; 244/121; 244/131; 343/872
[58] Field of Search ................ 156/80, 295, 281, 315, 156/293, 629, 306.9; 29/1.2; 244/131, 121; 343/872; 102/517, 519

[56] References Cited

U.S. PATENT DOCUMENTS 3,116,547 1/1964 Nepple ................................ 156/92

Primary Examiner—John J. Gallagher
Attorney, Agent, or Firm—R. M. Heald; C. D. Brown; W. K. Denson-Low

[57] ABSTRACT

The structural and gas-light bond between a radome and a fuselage in a missile cna be simultaneously fabricated in an improved methodology which reduces the numbers of fixtures required to be utilized, dramatically reduces the time for cure, simplifies the procedure, reduces the cost of fabrication and increases the yield. The fabrication process is comprised of the steps of applying an HT-424 film adhesive on the vertical flange of an etched surface of a fuselage. The film is spaced apart from the butt surface of the flange. A fillet of EA-934 paste adhesive is laid and formed into the corner of the flange between its vertical surface and the radially extending butt surface. The radome is then assembled onto the flange with all the paste adhesive which is extruded from the flange during assembly being immediately removed with a dampened cloth saturated with isopropyl alcohol. The assembled radome and fuselage is set within a fixture and heated to the curing temperatures and times required for the structural HT-424 adhesive on the one hand and the gas-tight sealing EA-934 paste adhesive on the other. The assembled fuselage and radome is then removed from the oven and allowed to cool with the result being a fully cured gas-tight and structurally sound bond between the radome and fuselage.

19 Claims, 3 Drawing Sheets

METHOD FOR PRODUCING A GAS-TIGHT RADOME-TO-FUSELAGE STRUCTURAL BOND

This invention was made with Government support under Contract No. F08635-82-C-0001. The Government has certain rights in this invention.

BACKGROUND OF THE INVENTION

1. Field of the Invention

The invention relates to the field of forming gas-tight seals in missile bodies and in particular to a methodology of simultaneously forming a structural and gas-tight bond between the fuselage of the missile body and the forward projecting radome of the missile body.

2. Description of the Prior Art

In many applications, the interior of a missile body is filled with gas under pressure, such as nitrogen or other inert gas mixtures. It is necessary that the missile body remain gas-tight not only during handling and flight, but also during long periods of storage. Loss of the gas pressure and contamination from outside gases and moisture will either entirely disable the missile, or subject it to a serious probability of degradation of performance.

Therefore, the prior art had devised various methods for assembling and sealing the various sections of the missile body together, particularly the ceramic radome to the metallic fuselage. These prior art methods required extensive processing time and skill. Typically, five different materials were required to establish the bonding to the missile body, namely a film adhesive, a paste adhesive, a polysulfide sealant, a thickener or thickening agent and a preformed packing. These five elements, all included within a single joint or bond, were utilized to fabricate a seal which required fourteen assembly steps. One of the steps required curing the bond at three different temperatures for four or five hours. In addition, two different assembly fixtures were required, a first vacuum fixture used to manually inject the polysulfide into a gap between the radome and fuselage, and a second alignment fixture used to maintain proper alignment of the assembly in the elevated temperature cure. Furthermore, a final finishing step required a fourteen-day cure at room temperature prior to the performance of any leak testing to determine whether or not the bond had been adequately formed. In addition to the inherent complexity of the methodology, it also had to be very carefully performed to avoid defects in the seal, which required the attention of a skilled and experienced fabricator.

Turn to FIG. 1, which is a cross-sectional view of the radome-to-fuselage seal and joint area depicted as formed by the prior methodology. A radome 10 is structurally bonded through a gas-tight seal, described below, to a fuselage 12. Radome 10 is fitted within an inner flange portion 14 of fuselage 12. A Cab-O-Sil and polysulfide sealant 16 forms the bedding adhesive for base 18 of radome 10 which is seated against an O-ring 20. O-ring 20 has an inner diameter sized to accommodate the outer diameter of flange portion 14. O-ring 20 is disposed against butt flange surface 22 of fuselage 10 and the Cab-O-Sil, a trademark of Cabot Co. and polysulfide sealant 16 fills the space radially outside of O-ring 20 and between radome 10 and fuselage 12. The space between flange portion 14 and radome 10 is similarly filled with HT-424 film and paste adhesive manufactured by American Cyanimid.

The steps of prior art fabrication are as follows. Radome 12 is cleaned by vapor degreasing with trichloroethane. Thereafter the radome is removed from the vapor bath and cooled to room temperature. The fuselage bonding surface, the surface portion of fuselage 12 which will be provided as a bonding surface to radome 10, as depicted in FIG. 1, is wiped with acetone or methylethyl ketone. After wiping it is flushed with either acetone or methylethyl ketone and any excess solvent is removed. Fuselage 12 is allowed to air-dry at room temperature. An etching solution is prepared by adding chromium trioxide, sodium fluoride and sulfuric acid in an aqueous solution. The bonding surface of fuselage 12 is then etched in this solution. The etched fuselage is then rinsed with tap water and subsequently rinsed with deionized water. The fuselage is dried in an oven at 150 degrees F. for approximately ten minutes. The fuselage is then placed within a fabrication jig with a lower positioning ring strapped around the fuselage approximately three inches above its base. A seven-inch preformed packing O-ring 20 is then rinsed with acetone and placed around fuselage 12 on butt flange surface 22. A strip of frozen HT-424 film is applied to the bonding surface of the fuselage with the bottom of the adhesive strip just contacting the top of O-ring 20. The end strips of the adhesive are butted together without gaps or overlap.

The fuselage thus prepared is placed with its jig in a freezer at −40 degrees F. or colder. HT-424 paste, also manufactured by American Cyanimid, is a two-part paste which is now mixed. A thin film of HT-424 paste is applied to the interior bonding surface of radome 10 starting approximately ⅛ inch above the base of the radome and is spread evenly with a flat applicator. A bonding fixture is blown dry and cleaned while the cold fuselage is removed from the freezer. Radome 10 is then carefully mated to fuselage 12 so as to avoid squeeze-out of any adhesive in the bond gap. An upper positioning ring is placed upon radome 10 and aligned with respect to the positioning ring of fuselage 12. The radome and fuselage are then carefully placed within a bonding fixture with the positioning rings that are disposed on the radome and fuselage aligned with index marks in the bonding fixture. The rings are then secured to the bonding fixture by appropriate means and/or installed with alignment pins and then the fixture's threaded rods are tightened until the gap between the radome and fuselage is between 0.055 to 0.070 inch. The precise centering of the radome is confirmed in the bonding jig by means of an alignment pin which when properly aligned easily slips into the radome tip.

The bonding fixture together with the radome and fuselage is then placed into an oven and preheated to 220 degrees F. for a minimum of sixty minutes. Thereafter the temperature is increased to approximately 275 degrees F. and allowed to cure for a minimum of 120 minutes. The temperature is increased still further to 340 degrees F. for a minimum of 120 minutes. After the three-step oven treatment, the assembly is removed from the oven and allowed to cool to room temperature. After achieving room temperature the assembly is removed from the bonding fixture.

A polysulfide sealant and Cab-O-Sil thickener, manufactured for example by American Cyanimid, are then mixed according to the desired proportions and degassed. An enclosure is then placed on or around the fuselage which is connected to a vacuum pump. Bonding material is then injected into the gap using a syringe with an appropriate tip at maximum pressure while the interior of the fuselage and radome are evacuated. The gap is filled to a level just above a flush condition. Any cavities which may form are refilled. The assembly is then left for fourteen days at room temperature to cure.

After cure any excess bonding material is cut with an knife so that the bonding material is flush with the radome/fuselage surface.

The radome can now be tested to determine whether or not the seal is leak-tight. If the seal has been successfully made the radome/fuselage assembly is then prepared for appropriate painting, labelling, coatings and assembly with the remaining portions of the missile.

Therefore, what is needed is a methodology for bonding gas-tight seals in a missile body wherein the number of material elements in the seal may be reduced, wherein the number of process steps may be reduced, wherein the number of fixtures which are required during the fabrication may be reduced, and wherein the curing time and fabrication time may be reduced.

BRIEF SUMMARY OF THE INVENTION

The invention is a method for simultaneously forming a structural and gas-tight bond between a radome and fuselage having a flanged-end portion including first and second flange surfaces extending at angles to one another. Preferably, the first flange surface extends parallel to the longitudinal axis of the fuselage and the second flange surface extends parallel to an axis extending radially through the fuselage. The method comprises the steps of disposing a thin film of structural adhesive to a first surface. The first surface is at least one surface disposed between the radome and fuselage when the radome and fuselage are assembled. A gas-sealing adhesive is disposed at least on a second surface. The second surface is a surface disposed between the radome and fuselage when the radome and fuselage are assembled. The radome and fuselage are assembled together. The gas-sealing adhesive and structural adhesive is cured to increase bond strength of the adhesive.

As a result, the gas-sealing adhesive and structural adhesive are combined to simultaneously structurally bond the radome to the fuselage and to form a gas-tight seal therebetween.

In the step of disposing the gas-sealing adhesive, a fillet of paste adhesive is disposed on the second surface. The fillet is compressed and spread across at least the second surface during the step of assembling the radome to the fuselage.

In the step of disposing the gas-sealing adhesive, the gas-sealing adhesive is also disposed at least in part on the first surface.

In the step of disposing the gas-sealing adhesive, the gas sealing adhesive is disposed on the structural adhesive and on the first surface.

In the step of curing the structural adhesive and gas-sealing adhesive, the assembled radome and fuselage are subjected to a first and second elevated temperature for a corresponding first and second time period to cure the structural adhesive and the gas-sealing adhesive respectively.

During the step of assembling the radome and fuselage, the gas-sealing adhesive is squeezed from the second surface and the method further comprises the step of immediately removing excess gas-sealing adhesive as it is squeezed from the second surface.

In the illustrated embodiment the fuselage is generally cylindrical and the radome has a mating base portion. The cylindrical fuselage has a reduced diameter and vertically extending annular flange to form an outer diameter vertical surface as the first surface and also has a butt flange and horizontally extending surface as the second surface. The structural adhesive is in the form of thin film and is applied to the vertically extending exterior first surface of the flange and spaced apart from the butt flange second surface by a predetermined gap.

In the step of disposing the gas-sealing adhesive on the second surface, the gas-sealing adhesive is formed as a fillet in a corner volume defined by the vertically extending flange and the butt flange second surface.

In the step of assembling the radome to the fuselage, the radome is telescopically disposed exterior to the vertically extending flange of the fuselage and has a base surface opposing the flange butt surface of the fuselage.

In the step of disposing the gas-sealing adhesive, the gas-sealing adhesive is also disposed on the base surface of the radome.

The invention can also be characterized as a method for forming a structural and gas-tight bond between a radome and a fuselage, where the fuselage has a reduced diameter flange defining a longitudinally extending first surface and a radially extending second surface. The radome is disposed adjacent to the flange on the fuselage. The radome has a base surface. The base surface of the radome is disposable adjacent to the radially extending second surface of the fuselage. The method comprises the steps of:

a) etching a bonding surface of the fuselage including the longitudinally extending flange and radially extending second surface.

b) disposing a film of structural adhesive on the longitudinally extending surface of the fuselage not in contact with the radially extending second surface. The film of structural adhesive is maintained free of voids and wrinkles.

c) disposing a fillet of gas-sealing adhesive on at least a lower portion of the film of structural adhesive, and on a contiguous portion of the longitudinally extending flange surface and on an adjacent portion of the radially extending second surface. The gas-tight sealing adhesive is disposed on the base of the radome.

The radome is assembled onto the flange of the fuselage. Excess adhesive forced from between the fuselage and the radome as the radome and fuselage are telescopically assembled together is removed. The assembled radome and fuselage are disposed in a bonding fixture to securely position the radome and fuselage with respect to each other. The fixture and assembled radome and fuselage is heated to a first temperature for a first corresponding period of time. The fixture and the assembled radome and fuselage are then heated to a second temperature for a second corresponding period of time. The radome and fuselage are then cooled.

As a result, the assembled radome and fuselage are prepared for further processing steps, and a structural and gas-tight bond is simultaneously achieved.

In the step of disposing the structural adhesive onto the fuselage, the step is performed within a predetermined time period of the step of etching the fuselage.

The invention can still further be characterized as a method for simultaneously forming a structural and gas-tight bond between a radome and fuselage comprising the steps of disposing a thin film of structural adhesive on a first surface. The first surface is at least one surface disposed between the radome and fuselage when the radome and fuselage are assembled. A gas-sealing adhesive is disposed on at least on a second surface. The second surface is a surface disposed between the radome and fuselage when the radome and fuselage are assembled. The radome and fuselage are assembled together. The gas-sealing adhesive and structural adhesive are cured to increase bond strength of the adhesive.

As a result, the gas-sealing adhesive and structural adhesive are combined to simultaneously structurally bond the radome to the fuselage and to form a gas-tight seal therebetween.

In the step of curing the structural adhesive and gas-sealing adhesive, the adhesives are simultaneously and completely cured within a single heating step to permit further processing of the radome and fuselage without extended delay.

The invention and its various embodiments may be better visualized by turning to the following drawings wherein like elements are referenced by like numerals.

The invention and its various embodiments may now be better understood by turning to the following detailed description.

DETAILED DESCRIPTION OF THE PREFERRED EMBODIMENTS

The structural and gas-tight bond between a radome and a fuselage in a missile can be simultaneously fabricated in an improved methodology which reduces the number of fixtures required to be utilized, dramatically reduces the time for cure, simplifies the procedure, reduces the cost of fabrication and increases the yield. The fabrication process is comprised of the steps of applying an HT-424 film adhesive on the vertical flange of an etched surface of a fuselage. The film is spaced apart from the butt surface of the flange. A fillet of paste adhesive, such as EA-934 paste adhesive, is laid and formed into the corner of the flange between its vertical surface and the radially extending butt surface. The radome is then assembled onto the flange with all the paste adhesive which is extruded from the flange during assembly being immediately removed with a dampened cloth saturated with isopropyl alcohol. The assembled radome and fuselage is set within a fixture and heated to the curing temperatures and times required for the structural HT-424 adhesive on the one hand and the gas-tight sealing EA-934 paste adhesive on the other. The assembled fuselage and radome is then removed from the oven and allowed to cool with the result being a fully cured gas-tight and structurally sound bond between the radome and fuselage.

Figure 2:
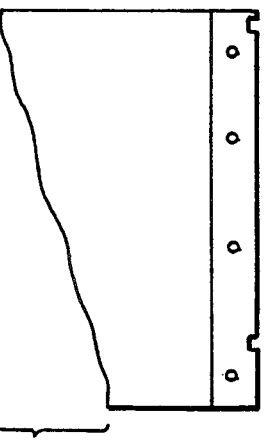
FIG. 2 is a perspective view of a radome being prepared according to the methodology of the invention.

Radome 10 depicted in perspective view in FIG. 2 is cleaned by vapor degreasing in 1,1,1 trichloroethane. Radome 10 is suspended in the vapor zone in a cleaning basket until vapor stops condensing on radome 10. It is then sprayed, flushed with solvent (1,1,1 tricholoroethane) and slowly removed from the vapor zone and cooled to room temperature. The bottom outside diameter of radome 10 is then masked using tape 24 to prevent the adherence of any adhesive on the outside surface of radome 10 during later processing steps.

An etching solution is prepared in a large glass beaker or plastic container by adding the materials in the amounts and order as follows. $860\pm5$ milliliters of deionized water has added thereto $22\pm1$ gram of chromium trioxide. $30\pm1$ gram of sodium fluoride is then subsequently added and followed by $96\pm5$ milliliters of sulfuric acid. The solution is mixed with a glass stirring rod until all of the solid particles have dissolved. The start and stop times of the etching process are recorded and the bonding area of the fuselage, namely flange portion 14, is immersed into the etchant for eight to ten minutes. Each batch of liquid etchant is used for only one fuselage and is thereafter disposed of.

Figure 3:
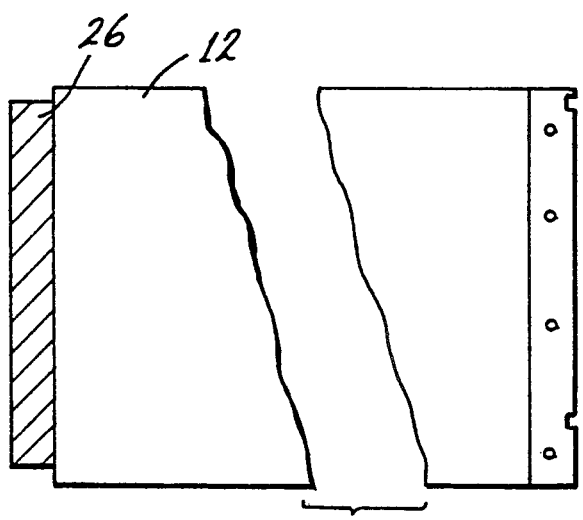
FIG. 3 is a side elevational view of a fuselage being prepared according to the methodology of the invention.

The etchant is rinsed from the bonding area 26 of flange position 14 as seen in FIG. 3 using cool tap water. A second rinse of the bonding area follows, using deionized water. The rinse water is controlled so as not to run over bonding area 26 from any other area of fuselage 12.

After fuselage 12 is rinsed, the time is recorded and adhesive is applied to bonding surface 26 within one hour of the rinse, as described below. Bonding area 26 is dried in an oven at 150 degrees F.$\pm10$ degrees for $10\pm2$ minutes. Fuselage 12 is thereafter allowed to cool to room temperature prior to any further bonding steps.

Figure 4:
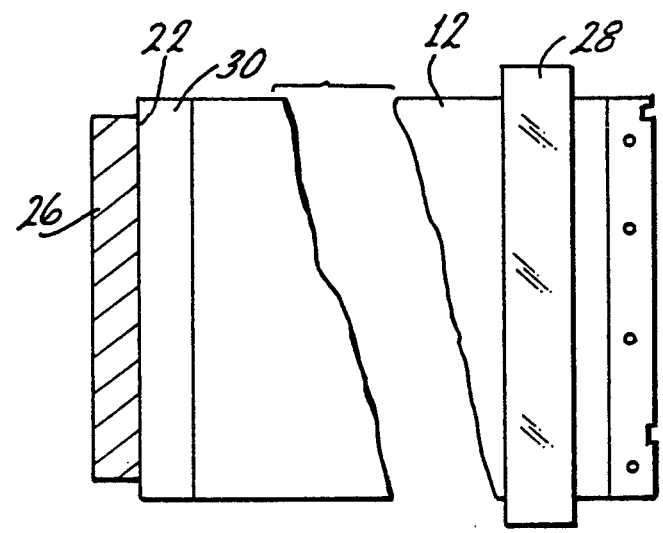
FIG. 4 is a partial perspective view of the flange portion of the fuselage being prepared according to the methodology of the invention after mounting of the lower positioning ring on the fuselage.
Figure 7:
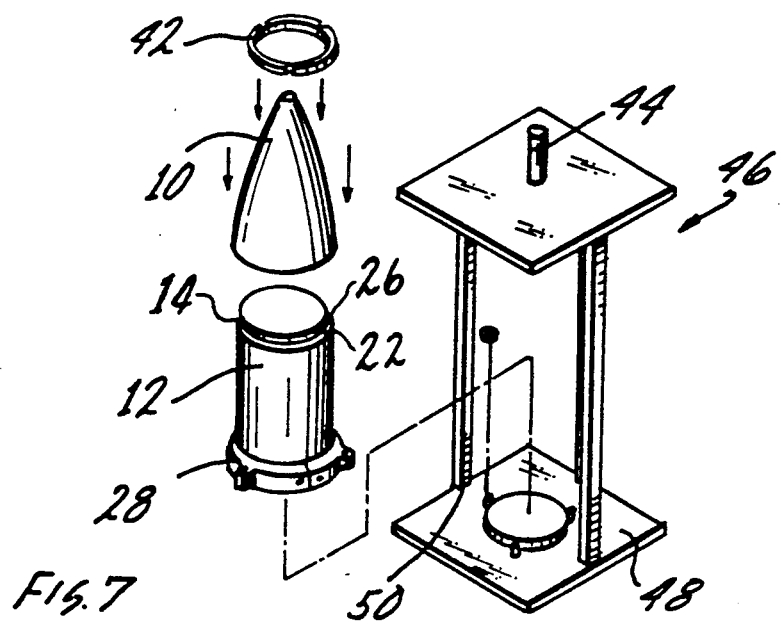
FIG. 7 is an exploded view of the radome and fuselage section as it is being placed in a bonding fixture according the invention.

As soon as fuselage 12 is cooled, the bonding operation begins immediately. Care is taken that the etched bonding area of fuselage 12 remains uncontaminated. A clean bonding fixture such as shown in FIG. 7 is provided. A lower positioning ring 28 is placed on fuselage 12 so that it is approximately three inches from the base of the fuselage. The screws, which were previously removed from the lower positioning ring, are then reinstalled and tightened. Fuselage 12 is then masked on its outer diameter adjacent to bonding surface 26 as seen in FIG. 4. Masking 30 is provided using a TA-302 tape manufactured by Permacel Corp., again for the purpose of avoiding any deposit of excess adhesive on the outside of fuselage 12 during subsequent processing steps.

HT-424 film, manufactured by American Cyanimid, is then removed from a freezer. A strip of HT-424 adhesive approximately one inch wide and 24 inches long is cut. If necessary, any voids or wrinkled areas are replaced with a new section of strip adhesive. Two or more strips may be used to form a single 24-inch length of strip adhesive. However, the strip ends must butt together without gaps or overlaps.

Still within the one-hour time limit of the rinsing of the etchant, the protective backing is removed from one surface of the HT-424 film adhesive. The adhesive film is then applied to fuselage bonding surface 26, taking care to keep the edges of the film strip flush to within about 0.05 inch above fuselage butt flange surface 22. Adhesive is applied smoothly and without wrinkles. It is pressed firmly against fuselage 12 to insure continuous contact between the adhesive and the fuselage. Any excess adhesive film is trimmed away with a sharp blade or knife, using care not to disrupt any of the adhesive on bonding surface 26. The protective backing from the exterior film of HT-424 adhesive is left in place at this time.

A fillet of premixed EA-934 paste adhesive, manufactured by the Hysol Corp., is applied between the bottom edge of the film adhesive on bonding surface 26 and the butt flange surface 22 of fuselage 12. The fillet is smoothed with a forming tool that has been coated with Teflon (a trademark of Dupont Corp.)

Alternatively, instead of premixed EA-934 paste adhesive, a two-part adhesive material manufactured by the Hysol Corp., comprised of a first Part A and a second Part B constituent, and mixed in proportions of 100 parts of Part A and 33 parts of Part B may be thoroughly mixed together and then evacuated for a maximum of ten minutes to degas. The degassed mixture is then loaded in a syringe with minimum agitation. Thereafter, this alternative material may be applied between the bottom edge of the film adhesive and butt flange surface 22 of fuselage 12.

The prepared fuselage is now placed in a freezer which is no warmer than −40 degrees F. for a minimum of twenty minutes. A thin film of EA-934 paste adhesive is then applied to the base surface 23 of radome 10. Base surface 23 of the radome is completely covered with paste adhesive with care being taken to keep the paste adhesive off any of the inner radome surfaces. Thus, only surface 23 which will mate against butt flange surface 22 of fuselage 12 is provided with an adhesive coating.

Figure 5:
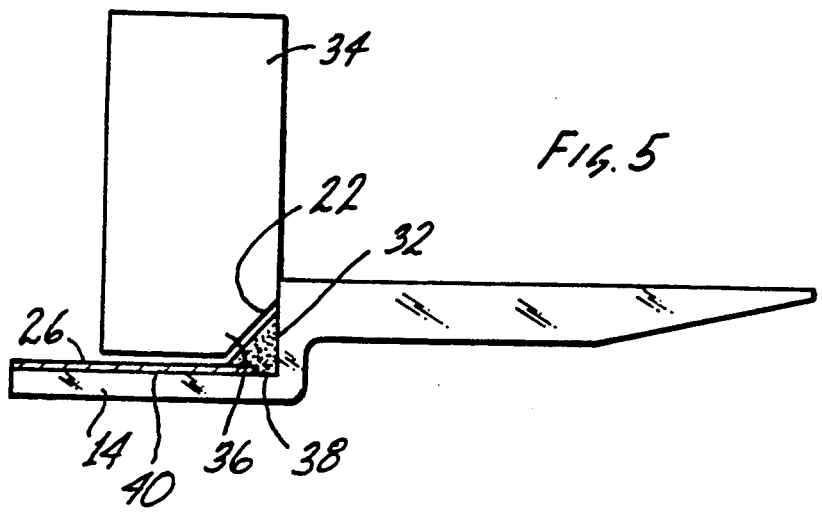
FIG. 5 is a simplified cross-sectional view showing a preparation step of the flange portion of the fuselage according to the methodology of the invention.

The cold fuselage is now removed from the freezer and the protective backing from the HT-424 film adhesive is immediately removed. The fillet of EA-934 paste is pressed and formed into the corner between flange portion 14 and butt surface 22 of fuselage 12 as best depicted in cross-sectional view in FIG. 5 by means of a forming tool 34 having a shape mating corner 36. Therefore, fillet 32 completely fills corner 38 and is spread against the lower portion of HT-424 film adhesive 40 and butt surface 22. The radome is thereafter immediately installed and seated on the forward fuselage assembly 12 while fuselage 12 is still cold. Any excess EA-934 adhesive which is squeezed out as the fuselage warms up to room temperature and as radome 10 seats against its mating surface on fuselage 12 is removed using a lint-free cloth saturated with isopropyl alcohol.

As best depicted in FIG. 7, an upper positioning ring 42 is placed upon radome 10 and appropriately aligned with lower positioning ring 28 which is fitted to the bottom of fuselage 12. Alignment pin 44 is removed from bonding fixture 46 and the radome and fuselage carefully placed within fixture 46 so that positioning rings 28 and 42 are appropriately aligned to index marks within fixture 46. The positioning ring is then fixed by means of nuts and washers to base 48 of bonding fixture 46. Positioning ring 42 is carefully adjusted on radome 10 to allow positioning of thread rods through slots defined in ring 42, which thread rods (one of which rods 50 is shown in FIG. 7) are fixed to base 48 of fixture 46. Alignment pin 44 is then reinstalled and nuts are tightened on thread rods 50 until radome 10 and fuselage 12 are fully mated and alignment pin 44 slides easily into the tip of radome 10. Any excess EA-934 paste adhesive which is squeezed out is removed with a lint-free cloth saturated in isopropyl alcohol.

The fuselage and radome are then allowed to set for a minimum of two hours and maximum of 18 hours prior to curing. The radome/fuselage assembly with its fixture is placed into an oven which is preheated to 140 degrees F.±10 degrees and allowed to cure for 60±10 minutes.

The temperature in the oven is then increased to 340 degrees F.±10 degrees and allowed to cure for a minimum of 60 minutes. The cured assembly is then removed from the oven and allowed to cool to a temperature below 200 degrees F. The fuselage and radome assembly is then removed from bonding fixture 46 and can now be subjected to subsequent handling and processing according to conventional procedures.

Figure 1:
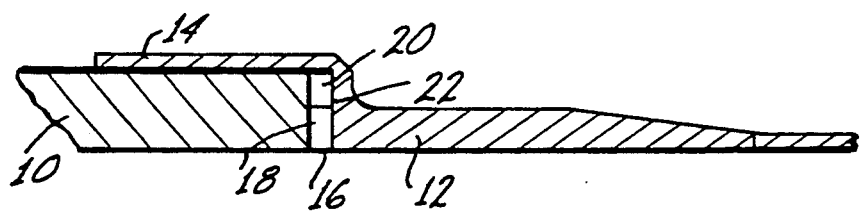
FIG. 1 is a simplified cross-sectional view of a portion of the radome--to-fuselage seal shown after it has been completely fabricated according to the prior art.
Figure 6:
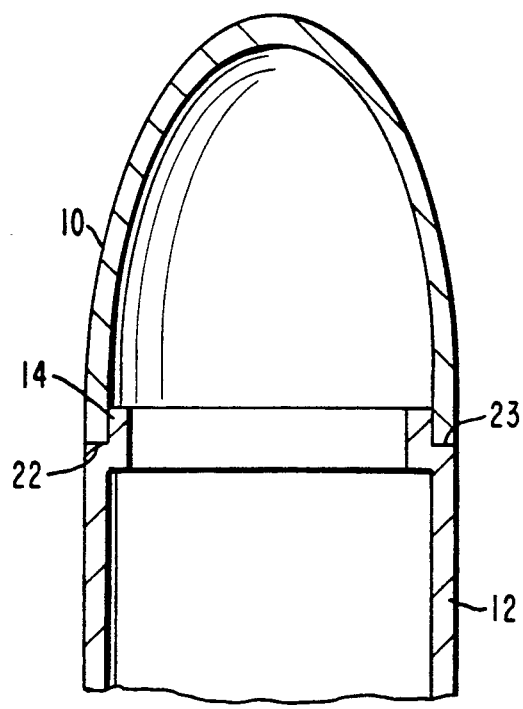
FIG. 6 is a cross-sectional view of the radome mounted on the flanged-end portion of the fuselage.
Figure 8:
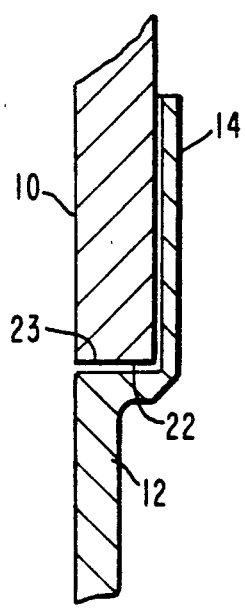
FIG. 8 is an enlarged cross-sectional view of the assembly encircled in FIG. 6, showing the randome-to-fuselage seal as formed by the methodology of the present invention.

What results is the bonding structure as depicted in FIG. 6 which is much simpler than that obtained by prior art methodologies as shown in FIG. 1 and does not require as flawless an implementation of the method steps as was previously necessary. Fabrication may be accomplished by a less skilled and experienced fabricator with less attention and care and with no compromise of the seal quality. More importantly, only two curing steps are required in the oven which require approximately 100 minutes and after which time the assembly may be cooled and handled without further delay. Not only is the structural seal as strong and as gas-tight as prior art seals, but the percentage of defects when fabricated according to the above-described methodology is dramatically lowered, time of fabrication is significantly reduced, and the cost of fabrication materially decreased. The difficulty in the prior art systems, namely having a structural bonding system which employed two adhesive systems, one to achieve a load-bearing capacity and the other to accomplish a gas-tight seal, is now achieved in the methodology of the present invention by the simultaneous combination of two adhesives to accomplish the dual purpose in one continuous operation. A two-step elevated temperature cure sequence is employed to separately and independently cure each adhesive system.

Many modifications and alterations may be made by those having ordinary skill in the art without departing from the scope and spirit of the invention. Therefore, it must be understood that the illustrated embodiment has been set forth only for clarity and as an example, and should thus not be read as limiting the invention as defined in the following claims.

What is claimed is:

1. A method for simultaneously forming a structural and gas-tight bond between a randome and fuselage, said fuselage having a flanged-end portion including first and second flange surfaces extending at angles to one another and said randome having an base portion including inner and base surfaces extending at angles to one another, said method comprising:
   disposing a thin film of structural adhesive on said first flange surface, wherein said first flange surface contacts said randome interior surface when said random and fuselage are assembled;
   disposing a gas-sealing adhesive on at least said second flange surface, wherein second flange surface contacts said randome base surface when said random and fuselage are assembled;

assembling said randome and fuselage together; and curing said gas-sealing adhesive and structural adhesive to increase bond strength of said adhesive, whereby said gas-sealing adhesive and structural adhesive are combined to simultaneously structurally bond said randome end portion to said fuselage flanged-end portion, forming a gas-tight seal therebetween.

2. The method of claim 1 where in said step of disposing said gas-sealing adhesive, a fillet of paste adhesive is disposed on said second flange, surface, said fillet being compressed and spread across at least said second flange surface during said step of assembling said radome to said fuselage.

3. The method of claim 1 where in said step of disposing said gas-sealing adhesive, said gas-sealing adhesive is also disposed at least in part on said first flange surface.

4. The method of claim 3 where in said step of disposing said gas-sealing adhesive, said gas-sealing adhesive is disposed on said structural adhesive and on said first flange surface.

5. The method of claim 1 where in said step of curing said structural adhesive and gas-sealing adhesive, said assembled radome and fuselage are subjected to a first and second elevated temperature for a corresponding first and second time period to cure said structural adhesive and said gas-sealing adhesive respectively.

6. The method of claim 4 where during said step of assembling said radome and fuselage, said gas-sealing adhesive is squeezed from said second flange surface and further comprising the step of immediately removing excess gas-sealing adhesive as it is squeezed from said second flange surface.

7. The method of claim 6 where in said step of curing said structural adhesive and gas-sealing adhesive, said assembled randome and fuselage are subjected to a first and second elevated temperatures for corresponding first and second time periods to cure said structural adhesive and said gas-sealing adhesive respectively.

8. The method of claim 2 where in said step of curing said structural adhesive and gas-sealing adhesive, said assembled randome and fuselage are subjected to a first and second elevated temperatures for corresponding first and second time periods to cure said structural adhesive and said gas-sealing adhesive respectively.

9. The method of claim 1 wherein said fuselage is generally cylindrical and said randome has a mating base portion, said cylindrical fuselage having a reduced diameter and vertically extending annular flange to form an outer diameter vertical surface as said first surface and a butt flange and horizontally extending surface as said second surface, said structural adhesive being in the form of thin film and applied to said vertically extending exterior first surface of said flange and spaced apart from said butt flange second surface by a predetermined gap.

10. The method of claim 9 where in said step of disposing said gas-sealing adhesive on said second flange surface, said gas-sealing adhesive is formed as a fillet in a corner volume defined by said vertically extending flange and said butt flange second surface.

11. The method of claim 10 where in said step of assembling said radome to said fuselage, said radome is telescopically disposed exterior to said vertically extending flange of said fuselage and has a base surface opposing said flange butt surface of said fuselage.

12. The method of claim 11 where in said step of disposing said gas-sealing adhesive, said gas-sealing adhesive is also disposed on said base surface of said radome.

13. The method of claim where, in step of curing said structural adhesive and gas-sealing adhesive, said adhesives are simultaneously and completely cured within a single heating step to permit further processing of said randome and fuselage without extended delay.

14. A method for forming a structural and gas-tight bond between a randome and a fuselage, said fuselage having a reduced diameter flange defining a longitudinally extending first surface and a radially extending second surface, said radome being dispsoed adjacent to said flange on said fuselage, said randome having a base surface, said base surface of said radome being disposable adjacent to said radially extending second surface of said fuselage, said method comprising the steps of:

etching a bonding surface of said fuselage including said longitudinally extending flange and radially extending second surface;

disposing a film of structural adhesive on said longitudinally extending surface of said fuselage not in contact with said radially extending second surface, said film of structural adhesive being free of voids and wrinkles;

disposing a fillet of gas-sealing adhesive on at least a lower portion of said film of structural adhesive, a contiguous portion of said longitudinally extending flange surface and an adjacent portion of said radially extending second surface;

disposing said gas-tight sealing adhesive on said base of said radome;

assembling said radome onto said flange of said fuselage;

removing excess adhesive forced from between said fuselage and said radome as said radome and fuselage are telescopically assembled together;

disposing said assembled radome and fuselage in a bonding fixture to securely position said radome and fuselage with respect to each other;

heating said fixture and assembled radome and fuselage to a first temperature for a first corresponding period of time;

heating said fixture and said assembled radome and fuselage to a second temperature for a second corresponding period of time; and cooling said radome and fuselage, whereby said assembled radome and fuselage are prepared for further processing steps and whereby a structural and gas-tight bond is simultaneously achieved.

15. The method of claim 14 where in said step of disposing said fillet, said fillet is forced into and fills a corner volume defined between said longitudinally extending flange and said radially extending second surface.

16. The method of claim 14 further comprising the step of masking the lower exterior surface of said radome and the upper exterior surface of said fuselage to prevent disposition of adhesive on any exterior surface of said radome.

17. The method of claim 14 wherein said step of etching includes immersing a selected portion of said fuselage in an acidic etch for a predetermined time period and rinsing said acidic etch from said portion of said fuselage with at least one deionized water rinse.

18. The method of claim 17 wherein said step of etching further comprises the step of drying said fuselage in an oven at a predetermined temperature for a predetermined time.

19. The method of claim 14 wherein said step of disposing said structural adhesive to said fuselage is performed within a predetermined time period of said step of etching said fuselage.

* * * * *